UNITED STATES PATENT OFFICE.

ARTHUR LINZ, OF NEW YORK, N. Y., ASSIGNOR TO ULTRO-CHEMICAL CORPORATION, OF NEW YORK, N. Y., A CORPORATION OF NEW YORK.

LAKE.

1,369,252.    Specification of Letters Patent.    Patented Feb. 22, 1921.

No Drawing.    Application filed October 9, 1920.    Serial No. 415,901.

*To all whom it may concern:*

Be it known that I, ARTHUR LINZ, a citizen of the United States, residing in New York city, county of New York, borough of Manhattan, and State of New York, have invented certain new and useful Improvements in Lakes, of which the following is a full, clear, and exact specification.

My invention relates to colors and refers particularly to colors comprising metallic compounds of organic coloring matters.

I have discovered that a Bordeaux acid wool dyestuff produced by combining, or coupling, diazotized para-amino-phenetol and 2-naphthol 3:6 disulfonic acid can be converted into valuable colors and lakes by treating the said dyestuff with metallic salts in order to form a compound therewith.

The compound produced as above from diazotized para-amino-phenetol and 2-naphthol 3:6 disulfonic acid when converted into its univalent salts, such as sodium or potassium, is a dye soluble in water, and hence, not an insoluble lake.

I have found, however, that if the dyestuff compound be treated with solutions of a number of multivalent metals, that is, those metals having a greater valency than one, new compounds are found, many of which are lakes insoluble in water and in many organic chemicals. Lakes of this character, therefore, are of great value in the production of inks, paints and similar commercial products.

I have further discovered that, when the above described Bordeaux dyestuff is treated with a barium compound, a most unexpected result is obtained, in that the Bordeaux dyestuff is converted into a maroon lake with a bluish-red undertone.

The following is an example of the method of producing this particular barium lake:—

190 pounds of the sodium salt of the color produced from diazotized para-amino-phenetol and 2-naphtol 3:6 disulfonic acid are dissolved in 250 gallons of water at 80° C. and a solution of 140 pounds barium chlorid dissolved in 175 gallons of water at 80° C. is added with constant stirring. 100 pounds of blanc fixe 70% pulp is then added, stirred, brought to the boil, filtered, washed and dried, or the drying operation may be omitted and the lake maintained in a paste form.

Other substances, such as barium sulfate, aluminium hydrate, whiting, gypsum, &c., may be substituted for the barium chlorid.

The lake thus formed is notable for its brilliancy, its fastness to light and its insolubility in water and in many organic compounds such as benzol, toluol, linseed oil, &c. The lake gives shades of a rich maroon mass tone with a bluish-red undertone. Reduction of the lake produces para-amino-phenetol and 4-amino-2-naphthol 3:6 disulfonic acid.

The barium chlorid, mentioned in the above example, may be substituted by solutions of the other multivalent metals for the production of compounds of various colors and shades.

I do not limit myself to the particular chemicals, amounts, temperatures or mode of procedure described, all of which may be varied without going beyond the scope of my invention as described and claimed.

What I claim is:—

1. The process of producing a color which comprises treating the dyestuff producible from diazotized para-amino-phenetol and 2-naphthol 3:6 disulfonic acid with a multivalent metal.

2. The process of producing a lake which comprises treating the dyestuff producible from diazotized para-amino-phenetol and 2-naphthol 3:6 disulfonic acid with a barium compound.

3. The process of producing a lake which comprises treating the dyestuff producible from diazotized para-amino-phenetol and 2-naphthol 3:6 disulfonic acid with a solution of barium chlorid.

4. The color capable of being produced by treating the dyestuff producible from diazotized para-amino-phenetol and 2-naphthol 3:6 disulfonic acid with a multivalent metal which upon reduction yields para-amino-phenetol and 4-amino-2-naphthol 3:6 disulfonic acid.

5. The maroon lake capable of being produced by treating the dyestuff producible from diazotized para-amino-phenetol and 2-naphthol 3:6 disulfonic acid with a barium salt, which is insoluble in water, benzol, toluol and linseed oil and which upon reduction yields para-amino-phenetol and 4-amino-2-naphthol 3:6 disulfonic acid.

6. The maroon lake capable of being produced by treating the dyestuff producible from diazotized para-amino-phenetol and 2-naphthol 3:6 disulfonic acid with a solution of barium chlorid, which is insoluble in water, benzol, toluol and linseed oil and which upon reduction yields para-amino-phenetol and 4-amino-2-naphthol 3:6 disulfonic acid.

Signed at New York city, in the county of New York, and State of New York, this 8th day of October, 1920.

ARTHUR LINZ.